(12) United States Patent
Skaggs (10) Patent No.: US 9,095,120 B1
(45) Date of Patent: Aug. 4, 2015

(54) PET KENNEL

(71) Applicant: PET COOLER CARRIER, LLC, Troy, IL (US)

(72) Inventor: Craig Skaggs, Troy, IL (US)

(73) Assignee: Pet Cooler Carrier, LLC, Troy, IL (US)

( * ) Notice: Subject to any disclaimer, the term of this patent is extended or adjusted under 35 U.S.C. 154(b) by 0 days.

(21) Appl. No.: 13/911,252

(22) Filed: Jun. 6, 2013

Related U.S. Application Data (60) Provisional application No. 61/656,828, filed on Jun. 7, 2012.

(51) Int. Cl.
*A01K 1/03* (2006.01)
*A01K 1/02* (2006.01)
*A01K 1/035* (2006.01)

(52) U.S. Cl.
CPC ............ *A01K 1/0245* (2013.01); *A01K 1/0236* (2013.01); *A01K 1/031* (2013.01); *A01K 1/0356* (2013.01)

(58) Field of Classification Search
CPC ... A01K 1/031; A01K 1/0356; A01K 1/0245; A01K 1/00; A01K 1/0236; B65D 85/50
USPC ......... 119/496, 475, 482, 484, 416, 417, 454, 119/72
See application file for complete search history.

(56) References Cited

U.S. PATENT DOCUMENTS

| | | | |
|---|---|---|---|
| 315,925 A | 4/1885 | Evans | |
| 3,212,474 A * | 10/1965 | Higgins et al. | 119/475 |
| 3,577,957 A | 5/1971 | Sandig | |
| 3,703,159 A * | 11/1972 | Rose-Miller | 119/496 |
| 3,985,104 A | 10/1976 | Klemer | |
| 4,022,159 A * | 5/1977 | Salvia | 119/496 |
| 4,534,483 A * | 8/1985 | Kassis et al. | 215/306 |
| 4,899,693 A | 2/1990 | Arnold | |
| D308,429 S | 6/1990 | VanSkiver | |
| 5,016,570 A | 5/1991 | Henson | |
| D331,131 S | 11/1992 | Quillen | |
| 5,245,951 A | 9/1993 | Nicholson | |
| 5,289,797 A * | 3/1994 | Steudler, Jr. | 119/72 |
| 5,349,924 A | 9/1994 | Hooper, Jr. | |
| 5,549,074 A * | 8/1996 | Hui | 119/477 |
| 5,692,386 A | 12/1997 | Casey, Sr. | |
| 5,706,761 A * | 1/1998 | Mayer | 119/475 |
| 5,761,992 A | 6/1998 | Gallo | |
| 5,887,436 A | 3/1999 | Duddleston | |
| 6,112,701 A * | 9/2000 | Faith et al. | 119/475 |
| 6,196,975 B1 | 3/2001 | Labrecque et al. | |
| D445,222 S | 7/2001 | Ross | |
| 6,302,059 B1 * | 10/2001 | Faith et al. | 119/72.5 |

(Continued)

OTHER PUBLICATIONS

Skaggs, Craig: "Pet Carrier"; Design U.S. Appl. No. 29/445,635, filed Feb. 14, 2013 (26 pages).

(Continued)

*Primary Examiner* — Yvonne Abbott-Lewis
(74) *Attorney, Agent, or Firm* — Polsinelli PC (57) ABSTRACT

A pet kennel is described. The pet kennel includes an upper portion and a lower portion. The upper portion and the lower portion join together to define a pet chamber to house a pet. The upper portion includes a cooling media compartment above the pet chamber. The cooling media compartment is in fluidic communication with the pet chamber to provide hydration to the pet housed in the pet kennel.

20 Claims, 13 Drawing Sheets

(56) References Cited

U.S. PATENT DOCUMENTS

| | | |
|---|---|---|
| 6,336,427 B1 * | 1/2002 | Gabriel et al. ............ 119/475 |
| 6,427,631 B1 * | 8/2002 | Ross ............ 119/496 |
| 6,818,438 B2 * | 11/2004 | Muser ............ 435/304.3 |
| 6,840,193 B2 | 1/2005 | Kost et al. |
| D545,507 S | 6/2007 | Harper et al. |
| D546,005 S | 7/2007 | Harper et al. |
| 7,322,314 B1 | 1/2008 | Sweeney |
| 7,347,164 B2 | 3/2008 | Axelrod et al. |
| D566,907 S | 4/2008 | Barca |
| 7,513,217 B1 | 4/2009 | Leach |
| D603,112 S | 10/2009 | Pergolski |
| D608,954 S | 1/2010 | Tharp |
| D615,251 S | 5/2010 | Scherbing |
| 7,779,645 B2 | 8/2010 | Heimbach |
| 7,984,624 B2 | 7/2011 | Leitner |
| 8,171,887 B2 * | 5/2012 | Conger et al. ............ 119/417 |
| D671,691 S | 11/2012 | Neilan |
| D678,623 S | 3/2013 | Iranyi et al. |
| D680,696 S | 4/2013 | Hammel |
| 2010/0043716 A1 | 2/2010 | Klanke |

OTHER PUBLICATIONS

Skaggs, Craig; "Pet Carrier"; Design U.S. Appl. No. 29/446,011, filed Feb. 19, 2013 (27 pages).

* cited by examiner

PET KENNEL

PRIORITY CLAIM AND CROSS-REFERENCE TO A RELATED APPLICATION

This application claims the benefit of U.S. Provisional Application No. 61/656,828, filed Jun. 7, 2012, the entire disclosure of which is incorporated by reference herein.

FIELD OF INVENTION

A pet kennel for housing and transporting pets is herein described.

SUMMARY OF THE INVENTION

A pet kennel for housing and transporting pets is herein described. The pet kennel includes an upper portion and a lower portion. The upper portion and the lower portion join together to define a pet chamber that houses a pet for temporary storage. The upper portion includes a cooling media compartment. The cooling media compartment may be filled with a cooling media to provide a cooling effect to the pet chamber. The cooling media compartment may be in fluidic connection with the pet chamber. Ice may be placed in the cooling media compartment to cool the pet chamber. As the ice melts, water from the melting of the ice may pass to the pet chamber to hydrate the pet stored within the pet chamber.

The pet kennel may be used in a variety of situations and applications in which it is desired to cool and hydrate a pet. For example, the pet kennel may be used for airplane transportation in which the pet may be stored in the pet kennel for long durations of time in a cargo area of the airplane without receiving care from any caregivers. The pet kennel provides a safe place to store the pet, as well as providing the pet with water without risk of spillage. Also, the pet kennel may be used in the back of a pick-up truck or car. Although the pet kennel provides a cooling effect to the pet, the pet kennel with a pet therein should not be left inside of a locked-up car during a hot summer day.

In another aspect, a pet kennel is described. The pet kennel includes an upper portion and a lower portion. The upper portion and the lower portion join together to define a pet chamber to house a pet. The upper portion includes a cooling media compartment above the pet chamber.

In another aspect, a pet kennel to cool and hydrate a pet during storage is described. The pet kennel includes an upper portion having a front wall, a rear wall, a first side wall, a second side wall, and a ceiling. The lower portion includes a front wall, a rear wall, a first side wall, a second side wall, and a bottom. The upper portion and the lower portion join together to define a pet chamber to house a pet. The upper portion further includes a cooling media compartment above the pet chamber. The cooling media compartment forms or defines a basin. The basin includes a bottom surface that supports a cooling media to cool the pet. The pet kennel includes a fluid passage. The fluid passage includes a fluid passage entrance positioned in the bottom surface of the basin. The fluid passage includes a fluid passage exit in the ceiling of the pet chamber. A fluid metering device fluidly engages the fluid passage exit. A fluid from the cooling compartment passes to the fluid metering device via the fluid passage to provide hydration to the pet.

In another aspect, a pet kennel is described. The pet kennel includes an upper portion and a lower portion that join together to define a pet chamber to house a pet. The upper portion includes a cooling media compartment. The cooling media compartment is in fluidic communication with the pet chamber to provide fluid from the cooling media compartment to the pet chamber.

In another aspect, a method of housing a pet is described. The method includes providing a pet kennel. The pet kennel includes an upper portion and a lower portion. The upper portion and the lower portion join together to define a pet chamber to house a pet. The upper portion includes a cooling media compartment above the pet chamber and a fluid passage that fluidly connects the cooling media compartment and the pet chamber. The method further includes placing a pet in the pet chamber. The method further includes placing ice in the cooling media compartment to cool the pet.

DETAILED DESCRIPTION OF INVENTION

A pet kennel 10 will now be described with reference to FIGS. 1-23. The pet kennel 10 includes an upper portion 100 and a lower portion 300. The upper portion 100 connects or fits to the lower portion 300. The combination of the upper portion 100 and the lower portion 300 define a pet chamber 30 that holds a pet 20. The upper portion 100 and the lower portion 300 may clamp or lock together. The pet kennel 10 securely stores the pet 20 in the pet chamber 30, i.e., the pet 20 cannot normally escape the pet kennel 10 without a caretaker opening the pet kennel 10.

Figure 1:
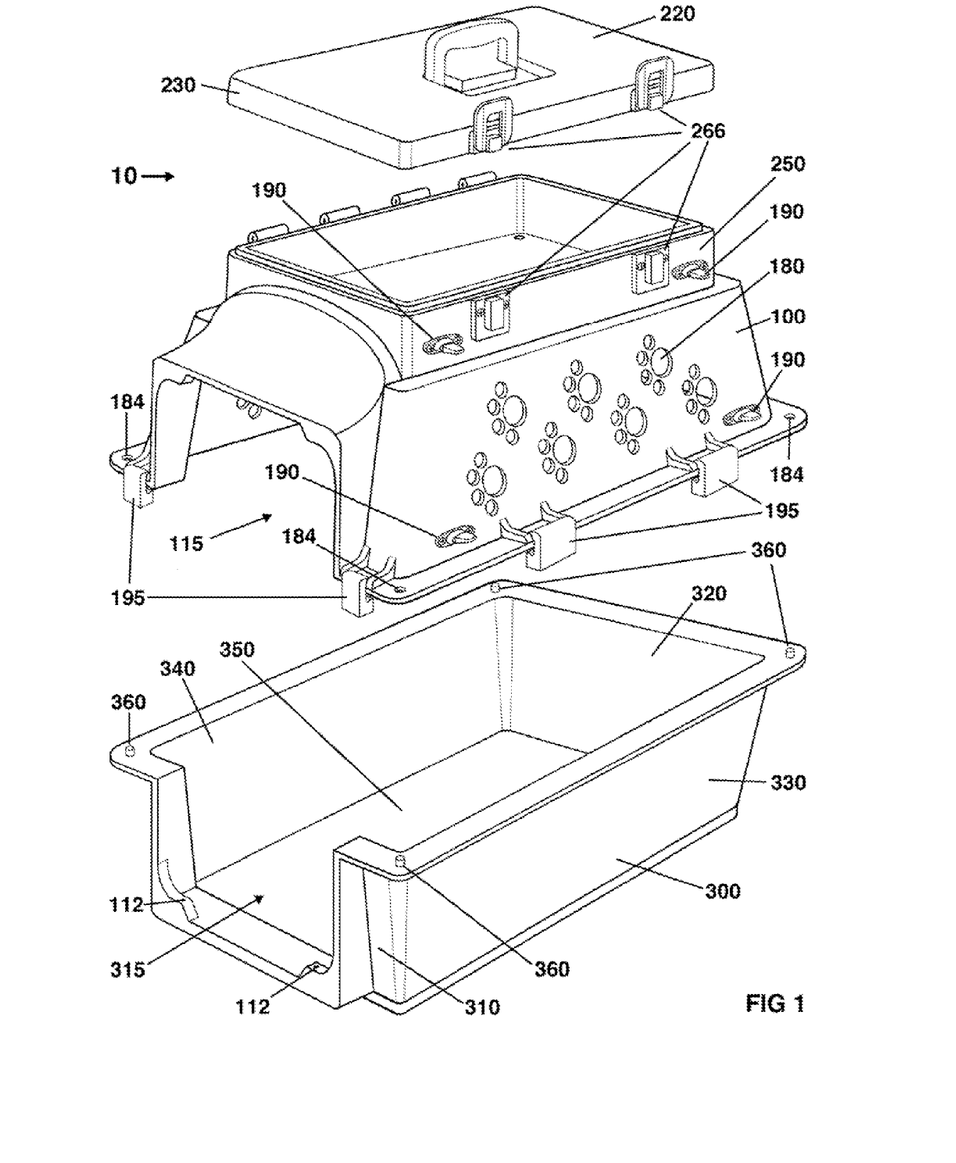
FIG. 1 shows an exploded view of the pet kennel.

An exploded view of the pet kennel 10 is shown in FIG. 1. The pet kennel 10 has an opening 40 that leads to the pet chamber 30. A door 50 is pivotally connected to the pet kennel 10 to open and close the opening 40. The pet 20 may be placed in the lower portion 300, and then the upper portion 100 is placed over the lower portion 300 to securely confine the pet 20. Alternatively, the pet 20 may be urged to enter the pet kennel 10 via the opening 40 with the door 50 closing behind the pet 20 to securely maintain the pet 20 in the pet chamber 30.

The upper portion 100 further includes a cooling media compartment 200. The cooling media compartment 200 may provide a cooling effect to the pet kennel 10 and to the pet chamber 30. A cooling media 210 may be placed into a basin 250 of the cooling media compartment 200. A lid 220 opens and closes the basin 250. The lid 220 may lock closed via latches 266 that securely hold the lid 220 closed on top of the basin 250. The entire pet kennel 10 may be picked up by grasping a handle 222 on top of the lid 220.

The upper portion 100 will now be described. The upper portion 100 includes a front wall 110 opposite of a rear wall 120. The front wall 110 includes an upper opening portion 115 that, in combination with a lower opening portion 315 of lower portion 300, forms the opening 40 of the pet kennel 10. The upper portion 100 further includes a first side wall 130 opposite of a second side wall 140. The front wall 110, the rear wall 120, the first side wall 130, and the second side wall 140 lead into or transition into a ceiling 150 of the upper portion 100. The ceiling 150 does not have any openings large enough to permit the pet 20 to escape the pet kennel 10. The ceiling 150 closes the upper portion 100.

The upper portion 100 further includes an upper portion flange 182 that surrounds most of a perimeter of the rear wall 120, the first side wall 130, and the second side wall 140. The upper portion flange 182 bends outward generally perpendicular to the rear wall 120, the first side wall 130, and the second side wall 140.

Figure 2:
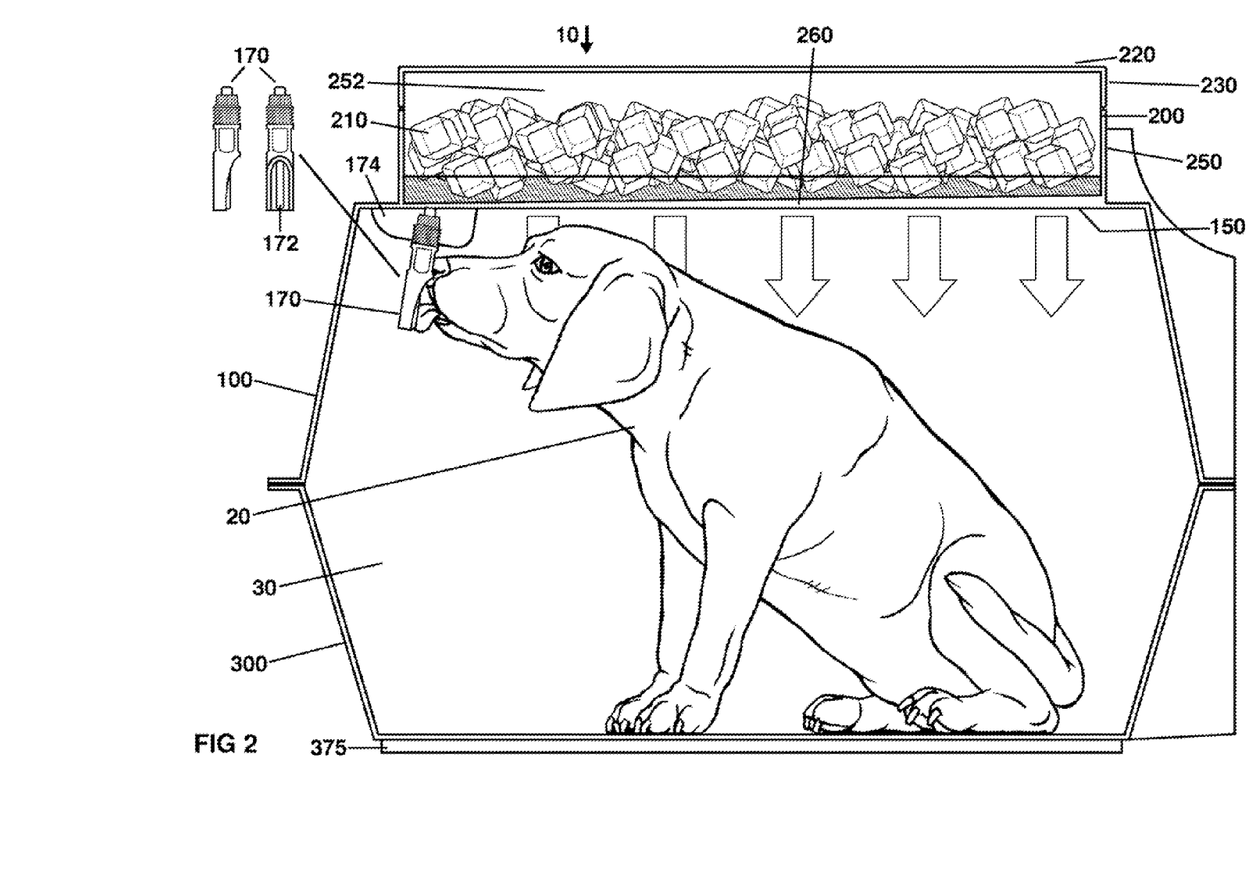
FIG. 2 shows a side sectional view of the pet kennel with a pet stored inside.
Figure 3:
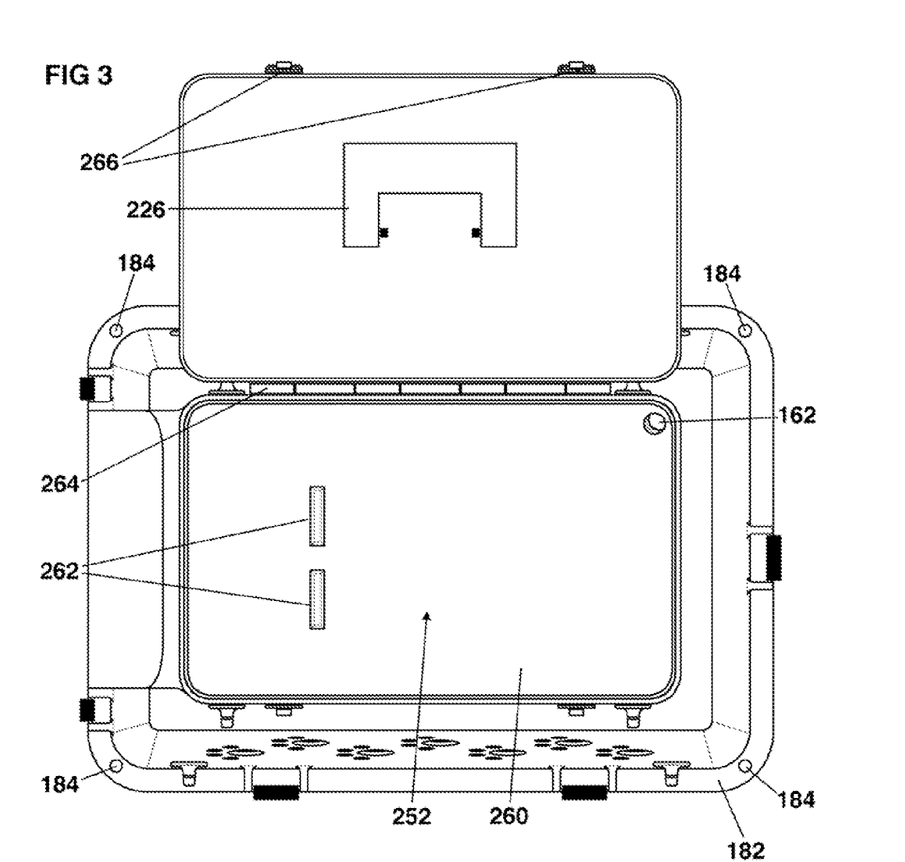
FIG. 3 shows a top down view of the pet kennel with the lid opened.

With reference to FIG. 2, the upper portion 100 further includes a cooling media compartment 200. The cooling media compartment 200 is positioned over the upper portion 100. The cooling media compartment 200 may be integral with the ceiling 150 of the upper portion 100. The cooling media compartment 200 includes or forms the basin 250 that receives the cooling media 210. The basin 250 includes sidewalls 254 and end walls 256 that define an interior 252. The interior 252 of the basin 250 holds the cooling media 210. The basin 250 further includes a bottom surface 260 that supports the cooling media 210.

Figure 23:
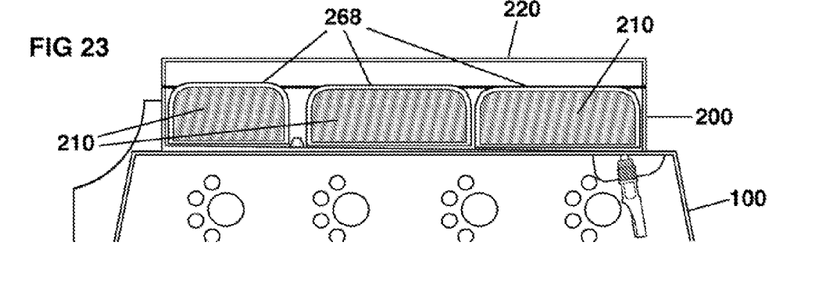
FIG. 23 shows views of the trays.

The lid 220 is hingedly connected to the basin 250 via a hinge 264. The latches 266 securely fasten the lid 220 to the basin 250. The lid 220 prevents ice and/or water from spilling out of the cooling media compartment 200. One or more trays 268 may be stored inside of the cooling media compartment 200. Tray positioners 262 are placed on the bottom surface 260 of the basin 250 to hold the trays 268 in position. Depending upon the user's preference, the trays 268 may hold ice cubes, dog treats, pet food, pet supplies, and/or solid ice. The trays 268 may be removed from the cooling media compartment 200, filled with water, and placed in a freezer until the water freezes. Then, the trays 268 may be placed in the cooling media compartment 200, in an inverted position, as shown in FIG. 23, such that water melting from the ice in the trays 268 hydrates the pet 20.

As shown in FIG. 2, the cooling media compartment 200 is fluidly connected to the pet chamber 30 of the pet kennel 10. The cooling media 210 may include ice to cool the pet chamber 30. As the ice melts into water, the water may pass from the cooling media compartment 200 to the pet chamber 30 to provide hydration to the pet 20. As shown in FIG. 2, the bottom surface 260 of the basin 250 may slope or drain towards a fluid passage 160. The bottom surface 260 of the basin 250 directs the fluid toward the fluid passage 160. The fluid passage 160 may fluidly connect to a fluid metering device 170. The fluid metering device 170 may be positioned in the pet chamber 30. Typically, the only openings in the bottom surface 260 of the basin 250 are for the fluid passage 160. The fluid passage 160 may include an opening or hole passing through the bottom surface 260 of the basin 250 and the ceiling 150.

The fluid metering device 170 may include a valve for other stopping mechanism to allow the pet 20 to selectively drink from the fluid metering device 170. The fluid passage 160 includes a fluid passage entrance 162 in the bottom surface 260 of the basin 250. The fluid passage 160 passes through the bottom surface 260 and the ceiling 150. The bottom surface 260 is generally free of any other openings or passages except for the fluid passage 160. As such, the basin 250 holds or stores the fluid until the fluid passes through the fluid passage 160. The fluid passage 160 further includes a fluid passage exit 164 in the ceiling 150 of the upper portion 100. The fluid metering device 170 may connect or receive fluid from the fluid passage exit 164. The ceiling 150 may include a connection portion 174 that receives the fluid metering device 170. The fluid metering device 170 may threadably connect or snap-fit to the connection portion 174. The pet 20 may be trained or learn to press on a lever 172 to release fluid from the fluid metering device 170. As such, the fluid metering device 170 may be pet-controlled. In other aspects, the fluid metering device 170 may be placed in the lower portion 300 and fluidly connected to the fluid passage 164 exit via tubing, hoses, pipes, etc. The fluid metering device 170 may act as a pet-operated valve that prevents the fluid from draining from the basin 250 until the pet operates the fluid metering device 170.

The lower portion 300 will now be described. The lower portion 300 includes a front wall 310 opposite of a rear wall 320. The front wall 310 defines or includes the lower opening portion 315. The lower opening portion 315 forms a portion of the opening 40. The lower portion 300 further includes a first side wall 330 opposite of a second side wall 340. The lower portion 300 further includes a floor 350 that connects the front wall 310, the rear wall 320, the first side wall 330, and the second side wall 340. The front wall 310, the rear wall 320, the first side wall 330, and the second side wall 340 all transition or form a lower portion flange 355. The lower portion flange 355 is engaged to the upper portion flange 182 to secure the upper portion 100 and the lower portion 300 together.

The lower portion flange 355 may include one or more pins 360 spaced about the lower portion flange 355. The pins 360 may be guided into openings 184 in the upper portion flange 182. The engagement between the pins 360 and the openings 184 provides for the proper registration and alignment between the upper portion 100 and the lower portion 300. Although four pins 360 and four openings 184 shown in the FIGS., the exact number of the pins 360 and the openings 184 and their respective positioning and placement may vary depending upon the size of the pet kennel 10. Compression latches 195 hold the upper portion 100 to the lower portion 300.

The lower portion 300 further includes a bottom surface 370. The bottom surface 370 includes a bottom rim 375 that fits over a lid perimeter 230 of the lid 220. This provides for the pet kennel 10 to be stacked on and engaged to a second pet kennel 10. The bottom rim 375 is slightly larger than the lid perimeter 230 to provide for the stackability.

The lid 220 includes the handle 222. A top surface 224 of the lid 220 includes a depression 226 that allows the handle 222 to fit into the lid 220 in a flush manner. This assists in the stackability of multiple pet kennels 10. Further, the handle 222 may provide a positioner or a guide for a ratchet strap or other rope type connecting member that may be used to secure the pet kennel 10 to a bed of a pick-up truck, trailer, or the like. The ratchet strap or rope connecting member may thread through an opening of the handle 222.

The cooling media compartment 200 may hold a variety of different cooling media 210. The cooling media 210 may include, for example, cubed ice, block ice, packages of cooling gel, etc. A single block of ice that fills the entire interior 252 of the basin 250 may be placed into the cooling media compartment 200 for maximum cooling effect. Also, trays 268 may be filled with water and then frozen for use in the cooling media compartment 200. In other aspects, the cooling media compartment 200 may be filled with a heating member, such as a microwavable heating packet, to provide a heating effect to the pet chamber 30.

Figure 4:
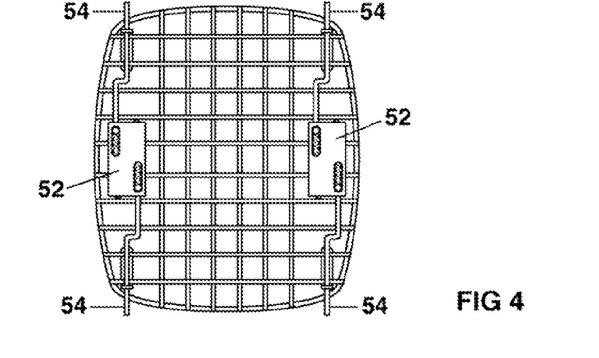
FIG. 4 shows a front view of the door.
Figure 5:
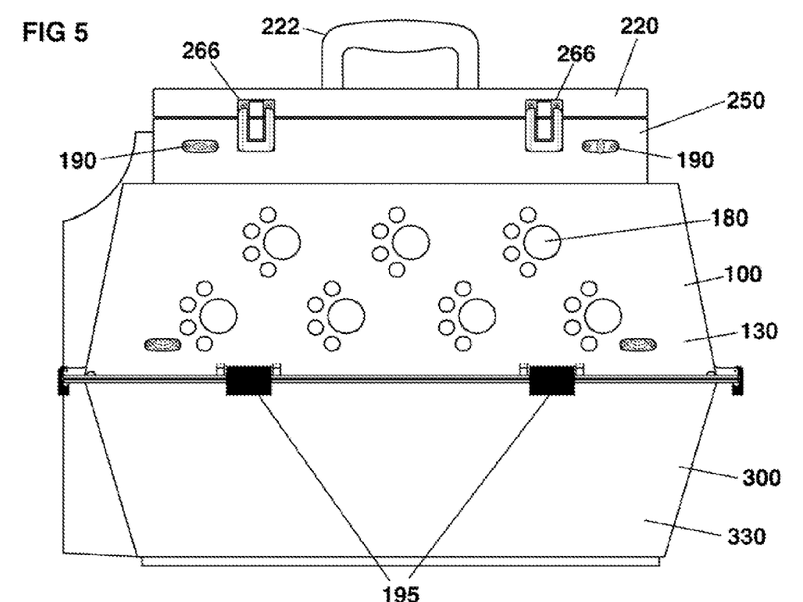
FIG. 5 shows a first side view of the pet kennel.
Figure 6:
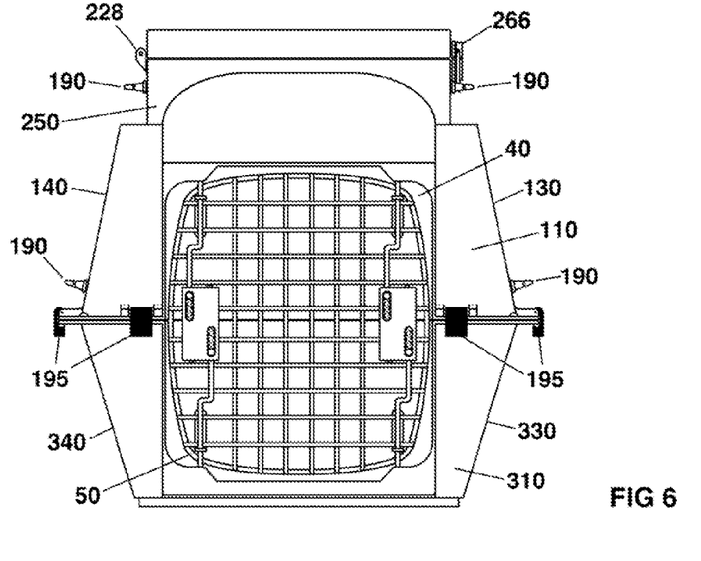
FIG. 6 shows a front view of the pet kennel.
Figure 7:
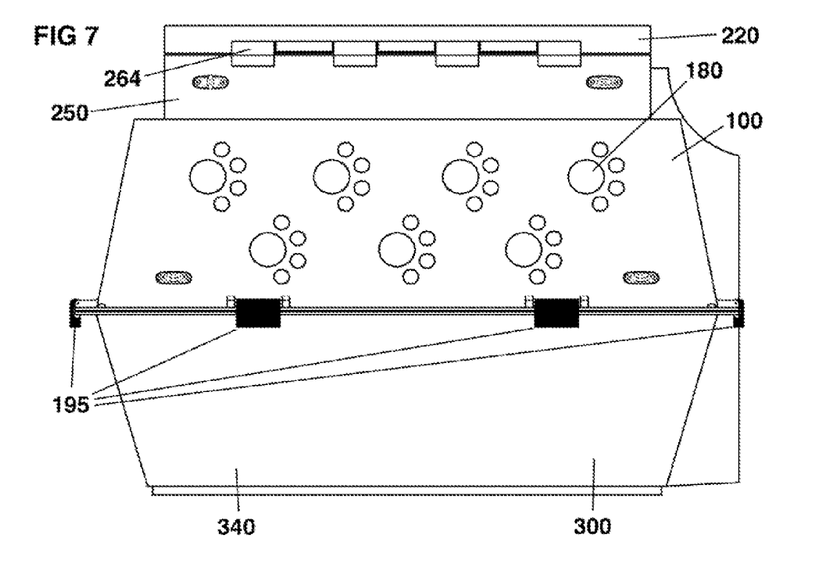
FIG. 7 shows a second side view of the pet kennel.
Figure 8:
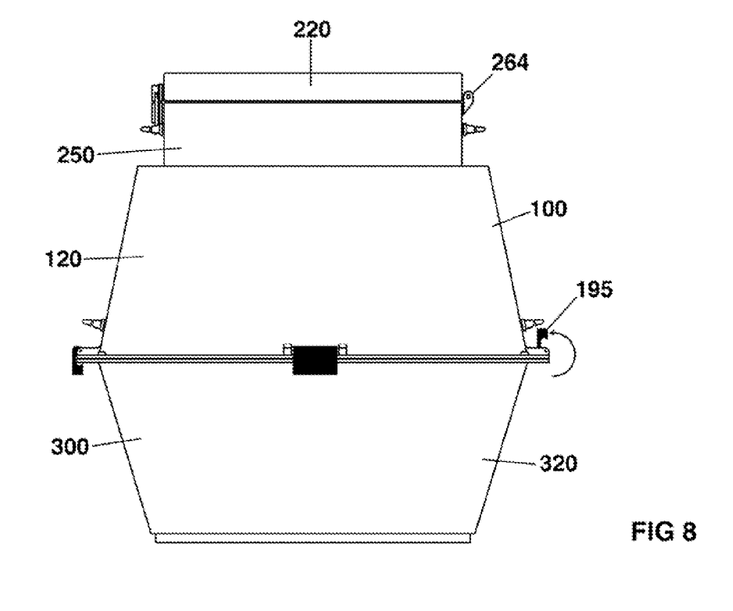
FIG. 8 shows a rear view of the pet kennel.
Figure 9:
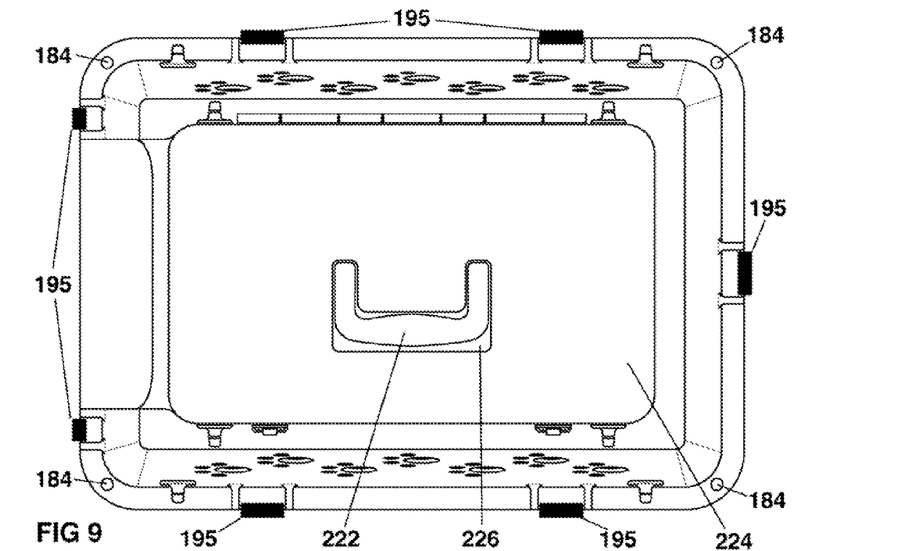
FIG. 9 shows a top down view of the pet kennel.
Figure 10:
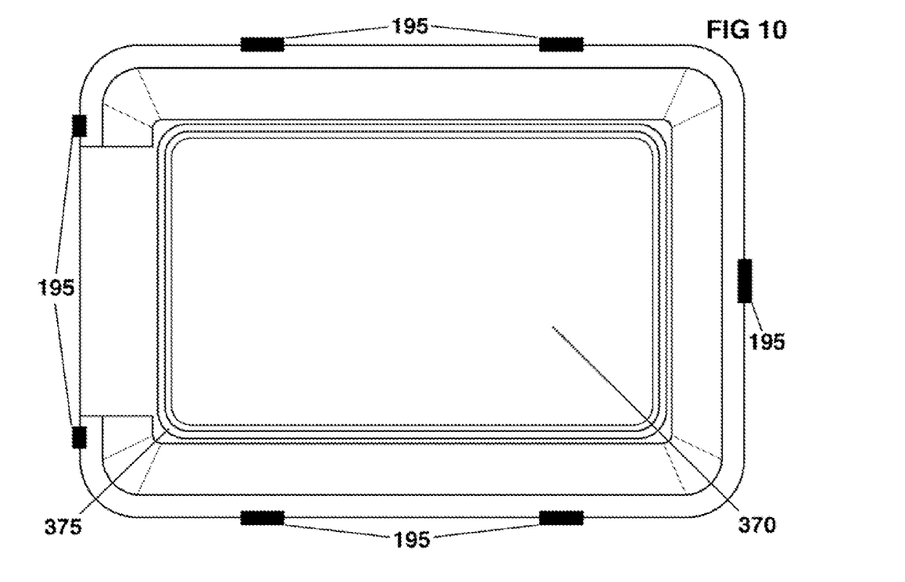
FIG. 10 shows a bottom view of the pet kennel.
Figure 11:
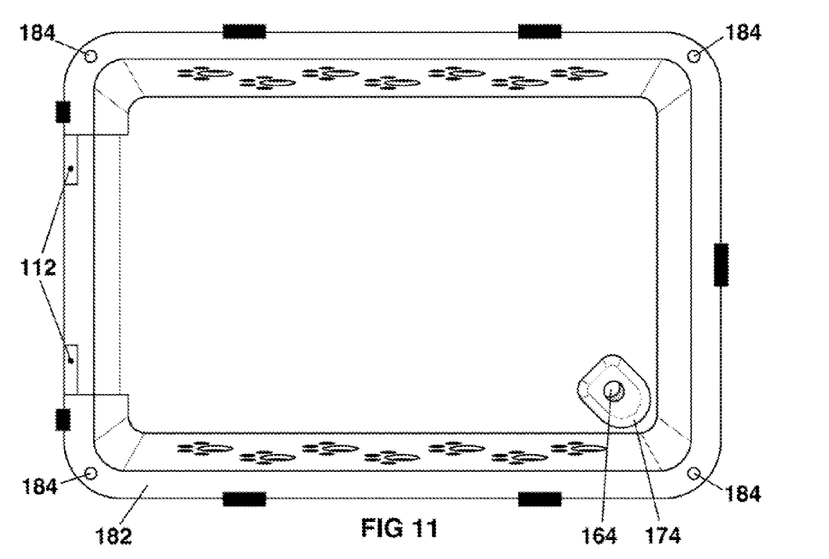
FIG. 11 shows a view of the ceiling of the upper portion.
Figure 12:
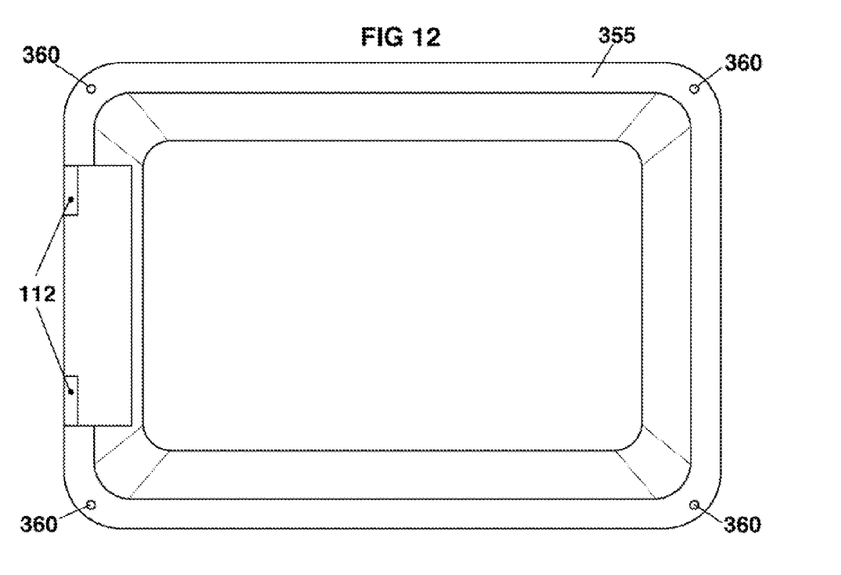
FIG. 12 shows a top down view of the lower portion.
Figure 13:
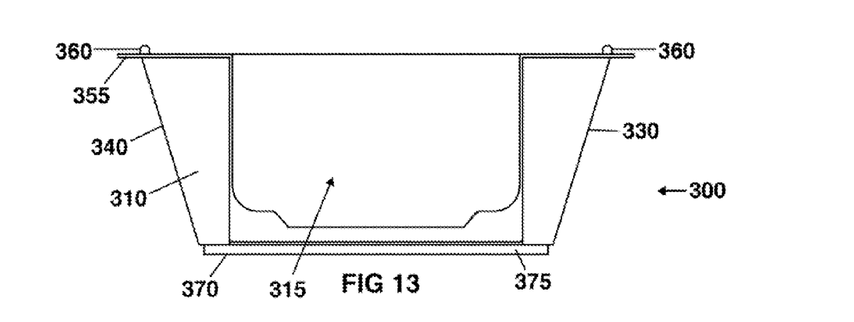
FIG. 13 shows a front view of the lower portion.
Figure 14:
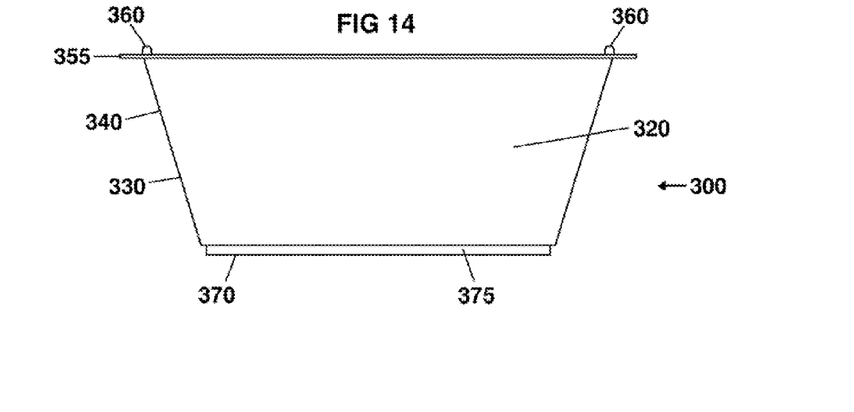
FIG. 14 shows a rear view of the lower portion.
Figure 15:
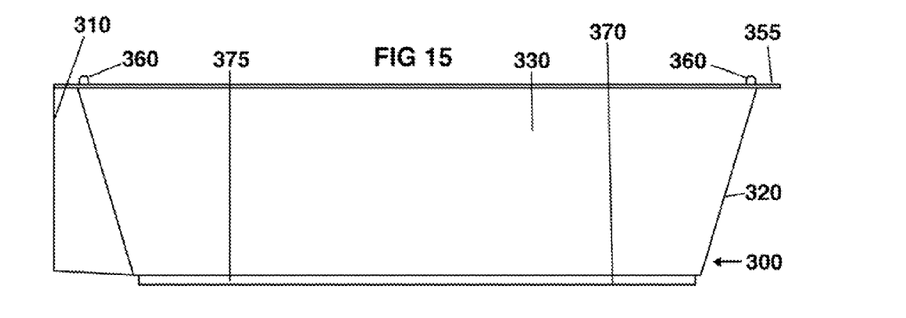
FIG. 15 shows a side view of the lower portion.

The door 50 opens and closes the opening 40 of the pet chamber 30. The door 50 may include a metal mesh structure, such as shown in FIG. 4. The door 50 includes spring closures 52 that bias axles 54 into openings 112 of the front wall 110 and the front wall 310. In operation, the spring closures 52 may be squeezed to retract one of the axles 54 from the openings 112 in order to pivot the door 50 open and closed on an opposite axle 54. Further, both of the axles 54 may be retracted such that the door 50 is totally removed from the pet kennel 10.

Figure 16:
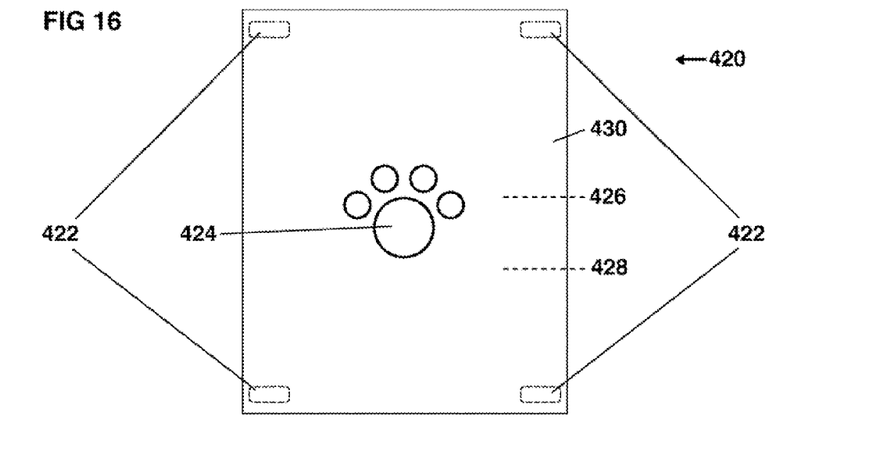
FIG. 16 shows a plan view of the front curtain.
Figure 17:
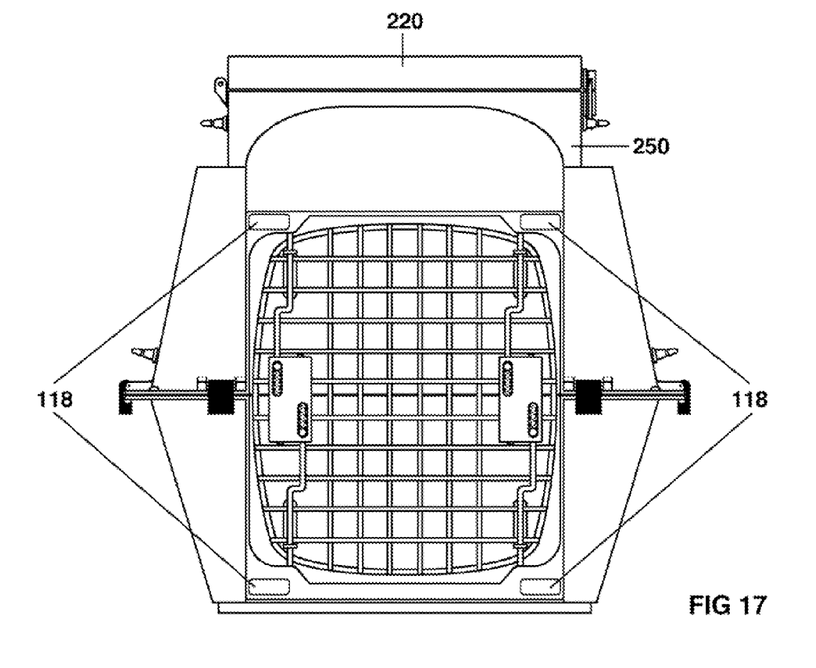
FIG. 17 shows a front view of the pet kennel that receives the front curtain.

With reference to FIGS. 16 and 17, an optional front curtain 420 is shown. The front curtain 420 fits over the door 50 and the opening 40 to help maintain cool temperatures in the pet chamber 30. The front curtain 420 may include a layered material having an outer layer 430, an insulating layer 428, and an inner layer 426. The insulating layer 428 may be formed from a metal foil, such as foil made from an aluminum alloy, or other heat reflective material.

The front curtain 420 may include a vent 424 to provide for passage of air to and from the pet chamber 30. The front curtain 420 may include one or more magnets 422 that engage the front curtain 420 to the front wall 110 of the upper portion 100 via metal members 118 positioned on the front wall 110 and the front wall 310. In other aspects, any other variety of attaching members may be used to attach the front curtain 420 to the pet kennel 10, such as, for example, snaps, hook and loop fasteners, zippers, buttons, ties, etc.

Figure 18:
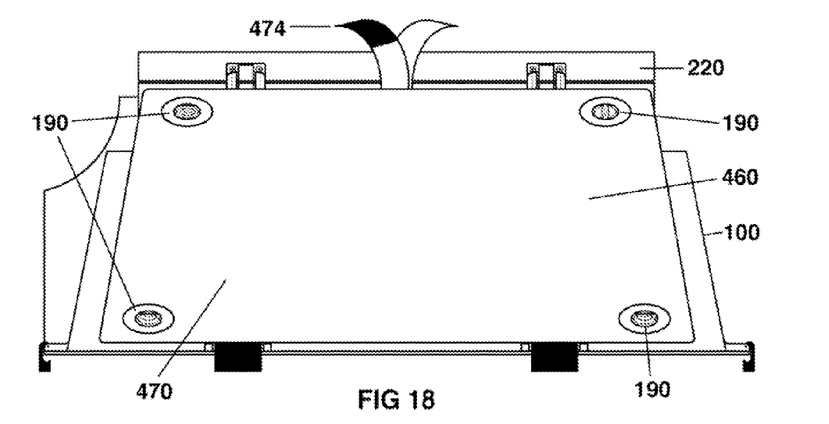
FIG. 18 shows a side view of the upper portion with the side curtain.
Figure 19:
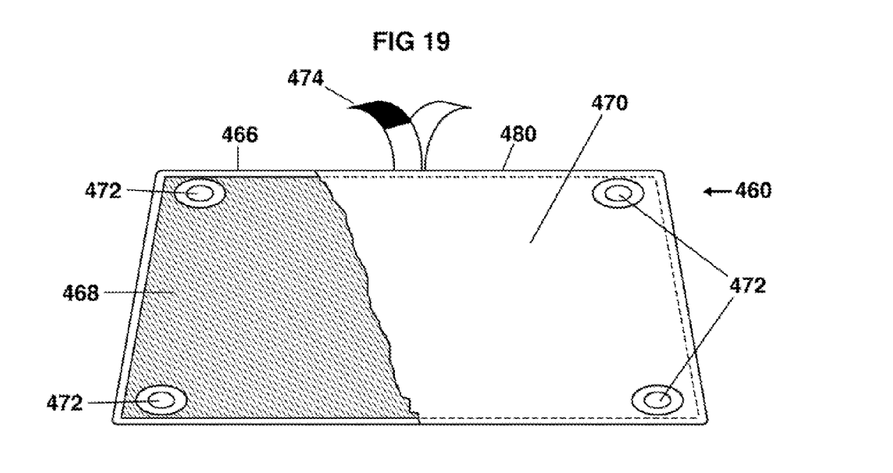
FIG. 19 shows a plan view of the side curtain.
Figure 21:
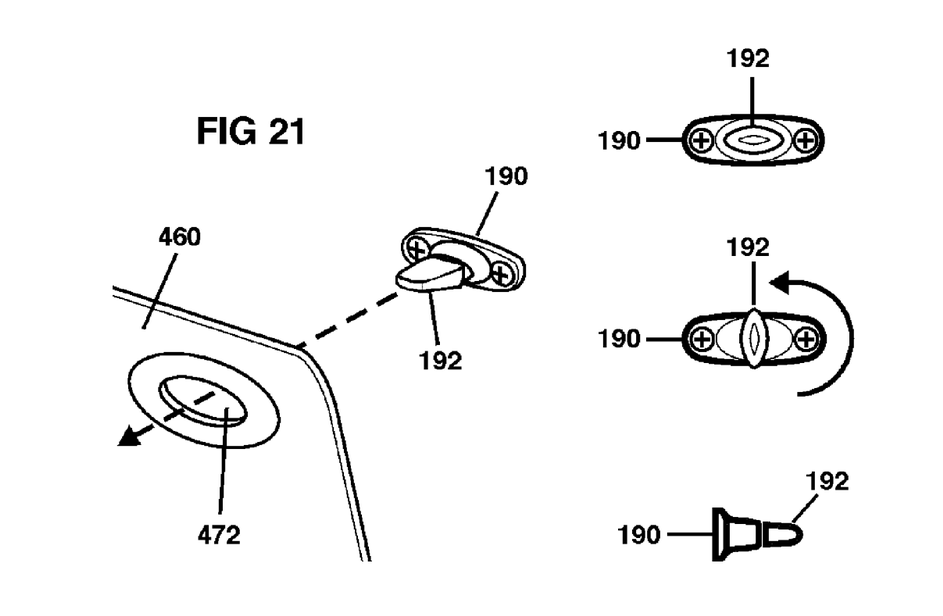
FIG. 21 shows the side curtain attaching to the turn latch.
Figure 22:
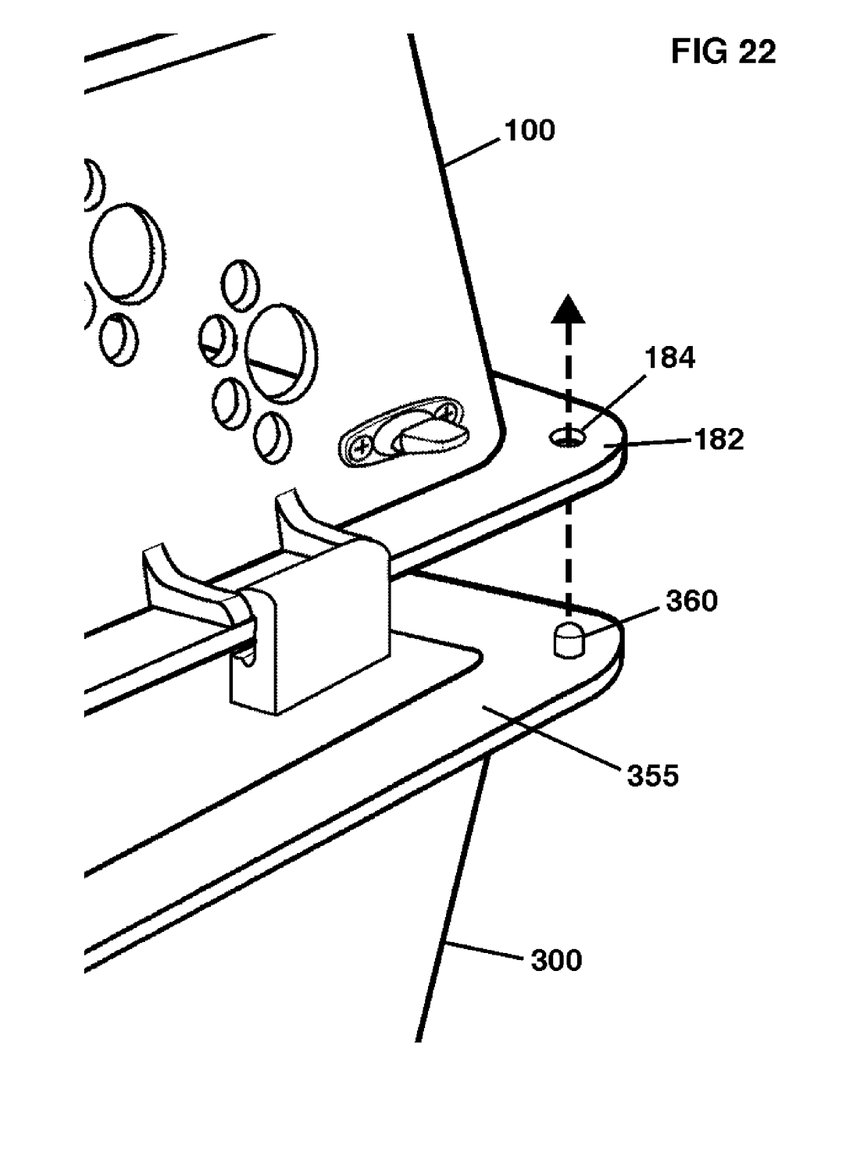
FIG. 22 shows a perspective view of the upper portion fitting to the lower portion.

As shown in FIGS. 18 and 19, optional side curtains 460 may be attached to the upper portion 100. The side curtains 460 may also include an outer layer 470, an insulating layer 468, and an inner layer 466. The side curtains 460 may include openings 472 that fit over turn latches 190. As shown in FIG. 21, the turn latches 190 include a turnable portion 192 that holds the side curtains 460 to the upper portion 100. The turnable portion 192 may be turned such that its longer dimension is generally perpendicular to a smaller dimension of the opening 472. The side curtains 460 may further include a securing member 474 positioned along an upper edge 480 of the side curtains 460. The securing member 474 may include a tie or a hook and loop fastener, such as VELCRO, that allows the side curtain 460 to be rolled up and held in a storage position.

Figure 20:
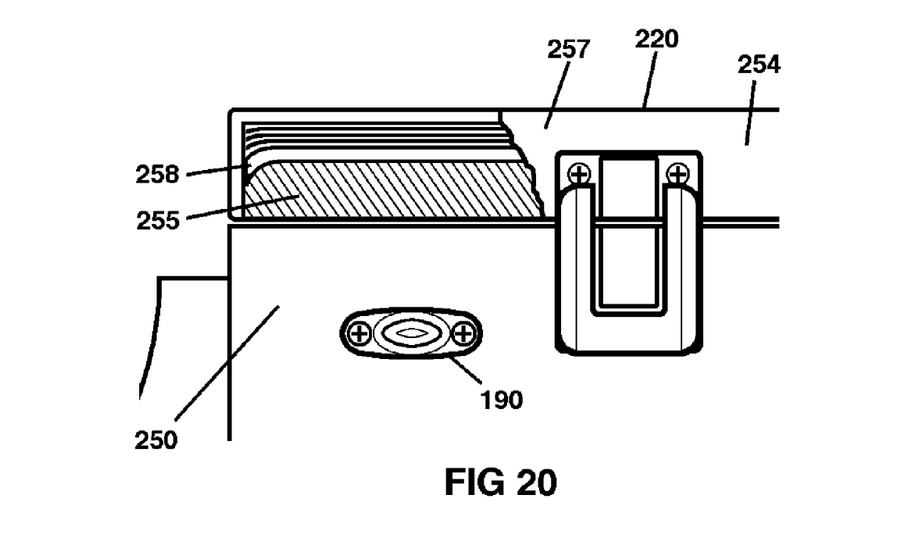
FIG. 20 shows a sectional view of the basin.

The basin 250 may be formed from plastic materials. The basin 250 may also be formed with an internal insulating member. For example, the side walls 254 and end walls 256 may be formed with an insulating member 255 therein. The insulating member 255 may include, for example, a layer of metal foil or sheeting made from an aluminum alloy or other heat reflective material. As shown in FIG. 20, the side wall 254 includes an outer layer 257 that is positioned over the insulating member 255. An inner layer 258 is positioned on the inside of the insulating member 255. The end walls 256 and the lid 220 may include the same insulating construction, i.e., the end walls 256 and the lid 220 may include an internal insulating member or multilayer construction. This provides a top portion of the cooling media compartment 200 that reflects heat away from the pet chamber 30 and also reflects cool back into the interior of the pet chamber 30. As such, the lid 220, the sidewalls 254, and the end walls 256 are providing a hat-type structure to cool the pet kennel 10. The use of the insulating member 255 in the side walls 254 or the use of the insulating member in the end walls 256 and/or the lid 220 also reflects incoming heat away from the cooling media 210 in the cooling media compartment 200 in order to prevent the cooling media 210 from melting or warming too fast.

The pet kennel 10 also provides warm housing for the pet 20 during cold conditions. The insulating layer 468 in the side curtains 460 and the insulating layer 428 in the front curtain 420 direct the radiant body heat from the pet 20 back into the pet chamber 30. The insulating member 255 in the side walls 254 and the use of the insulating member in the end walls 256 and/or the lid 220 also help to reflect the radiant body heat back into the pet chamber 30.

The cooling media compartment 200 may be scaled up or scaled down to hold varying amounts of the cooling media 210. The cooling media compartment 200 shown in FIGS. 1-23 holds approximately five pounds (5 lbs.) of cubed ice. The fluid metering device 170 may be removed from the ceiling 150 for cleaning. The fluid metering device 170 may include any of a variety of devices that selectively allow fluid to pass to the pet 20 or make fluid available to the pet 20. The fluid metering device 170 may include bottles, bowls, and other fluid delivery devices. The fluid metering device 170 may extend from the ceiling 150 down toward and into the lower portion 300. The fluid metering device 170 may also be positioned anywhere around the pet chamber 30. The fluid metering device 170 may be in fluidic communication with the cooling media compartment 200 via hoses, tubes, ducts, channels, etc to receive fluid from the cooling media compartment 200. One suitable fluid metering device 170 is a watering nipple that is commercially available from the Trojan Specialty Products of Dodge City, Kans. The fluid metering device 170 allows the animal to operate or trigger the device 170 to allow water to flow to the pet chamber 30. Importantly, the pet 20 is still securely maintained inside of the pet kennel 10 while drinking water from the cooling media compartment 200.

As shown in the FIGS., the cooling media compartment is directly above the pet chamber 30. This provides for the transfer of cool from the cooling media compartment 200 to the pet chamber 30. The ceiling 150 of the upper portion 100 forms the bottom surface 260 of the cooling media compartment 200. The ceiling 150 may be formed from a single layer of material that also forms the bottom surface 260 of the cooling media compartment 200. The ceiling 150 may also be formed from a first layer of material layer below a second layer of material that forms the bottom surface 260 of the basin 250. The ceiling 150 separates the pet chamber 30 from the cooling media compartment 200 and does not allow the pet 20 to escape the kennel 10 through the upper portion 100. As shown in the FIGS., the bottom surface 260 of the cooling media compartment 200 covers most of or a majority of the ceiling 150.

The fluid passage 160 fluidly connects the pet chamber 30 with the cooling media compartment 200. The fluid metering device 170 engages the fluid passage 160. The fluid metering device 170 is mounted to the ceiling 150, although it could be mounted lower in the pet chamber 30. The fluid passage 160 includes the fluid passage entrance 162 positioned in the cooling media compartment 200. The fluid passage 160 further includes the fluid passage exit 164 positioned in the pet chamber 30. The fluid metering device 170 fluidly engages the fluid passage exit 164. The fluid from the cooling compartment 200 passes to the fluid metering device 170 via the fluid passage 164.

The cooling media compartment 200 includes the side walls 254 and the end walls 256 that rise from the ceiling 150 of the upper portion 100. The cooling media compartment 200 may be integral with the upper portion 100.

Although the pet 20 shown in FIG. 2 is a dog, the pet kennel 10 may be used with any of a variety of domestic, agricultural, and exotic animals. Also, multiple fluid metering devices 170 may be installed in the kennel 10 to provide hydration to multiple pets 20.

The upper portion 100 and the lower portion 300 may be formed from a variety of plastic materials through conventional molding and thermoforming techniques. The size of the upper portion 100 and the lower portion 300 may be scaled up and down to accommodate smaller pets 20 and larger pets 20.

During manufacturing of the pet kennel 10, the upper portion 100 may be formed with the sidewalls 254 and the end walls 256 as integral members to the upper portion 100. In other aspects, the upper portion 100 is formed with an opening in the ceiling 150 that receives the basin 250, which is then welded, glued, or otherwise affixed to the upper portion 100.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A pet kennel, comprising:
an upper portion;
a lower portion;
the upper portion and the lower portion join together to define a pet chamber to house a pet;
an opening to the pet chamber;
a door to open and close the opening;
the upper portion comprising a cooling media compartment above the pet chamber, the cooling media compartment having a top opening to receive a cooling media, the cooling media compartment is integral with the upper portion; and,
a fluid passage fluidly connects the pet chamber with the cooling media compartment, and a fluid metering device engages the fluid passage.

2. The pet kennel according to claim 1, wherein the cooling media compartment is directly above the pet chamber, and the fluid passage passes through a bottom surface of the cooling media compartment.

3. The pet kennel according to claim 1, wherein the upper portion comprises a ceiling for the pet chamber, and the ceiling forms a bottom surface of the cooling media compartment.

4. The pet kennel according to claim 3, wherein the bottom surface of the cooling media compartment covers a majority of the pet chamber.

5. The pet kennel according to claim 3, wherein the ceiling separates the pet chamber from the cooling media compartment.

6. The pet kennel according to claim 1, wherein the fluid metering device is mounted to the upper portion.

7. The pet kennel according to claim 6, wherein a fluid from the cooling compartment passes to the fluid metering device via the fluid passage.

8. The pet kennel according to claim 6, wherein the fluid passage comprises a fluid passage entrance positioned in the cooling media compartment, wherein the fluid passage comprises a fluid passage exit positioned in the pet chamber, and the fluid metering device fluidly engages the fluid passage exit, wherein a fluid from the cooling compartment passes to the fluid metering device via the fluid passage.

9. A pet kennel, comprising:
an upper portion;
a lower portion;
the upper portion and the lower portion join together to define a pet chamber to house a pet;
an opening to the pet chamber;
a door to open and close the opening;
the upper portion comprising a cooling media compartment above the pet chamber, the cooling media compartment having a top opening to receive a cooling media; and,
a fluid passage fluidly connects the pet chamber with the cooling media compartment, and a fluid metering device engages the fluid passage;
wherein the fluid passage passes through a bottom surface of the cooling compartment, wherein the fluid passage comprises a fluid passage entrance positioned in the bottom surface of the cooling compartment, wherein the fluid passage comprises a fluid passage exit in a ceiling of the pet chamber, and the fluid metering device fluidly engages the fluid passage exit, and wherein a fluid from the cooling compartment passes to the fluid metering device via the fluid passage.

10. The pet kennel according to claim 9, wherein the cooling media compartment is integral with the upper portion.

11. The pet kennel according to claim 1, wherein the cooling media compartment includes sidewalls and end walls that raise from the upper portion, and wherein the sidewalls and the end walls define a basin.

12. The pet kennel according to claim 11, wherein the cooling media compartment includes a bottom surface free of any openings except for the fluid passage.

13. The pet kennel according to claim 11, wherein the basin has an interior, and a cooling media is placed in the basin.

14. The pet kennel according to claim 13, wherein the cooling media is ice, the ice cools the pet chamber, and water from the ice passes to the fluid metering device in an interior of the pet kennel via the fluid passage.

15. The pet kennel according to claim 1, wherein a lid is connected to the cooling media compartment, and the lid closes the top opening of the cooling media compartment.

16. The pet kennel according to claim 1, wherein the cooling media compartment forms a basin to hold fluid, and the basin includes the fluid passage to provide the fluid to the metering device in the pet chamber.

17. The pet kennel according to claim 1, wherein the cooling media compartment includes a bottom surface that completely covers the pet chamber.

18. The pet kennel according to claim 1, wherein fluid metering device hydrates a pet in the pet chamber.

19. A pet kennel to cool and hydrate a pet during storage, comprising:
an upper portion, the upper portion comprising a front wall including an upper opening portion, a rear wall, a first side wall, a second side wall, and a ceiling;
a lower portion, the lower portion comprising a front wall including a lower opening portion, a rear wall, a first side wall, a second side wall, and a bottom;
the upper portion and the lower portion join together to define a pet chamber to house a pet;

an opening to the pet chamber formed by the upper opening portion and the lower opening portion;

a door to open and close the opening;

the upper portion further comprising a cooling media compartment above the pet chamber, the cooling media compartment forms or defines a basin, the basin comprising a bottom surface that supports a cooling media to cool the pet; and, a fluid passage, wherein the fluid passage comprises a fluid passage entrance positioned in the bottom surface of the basin, wherein the fluid passage comprises a fluid passage exit in the ceiling of the pet chamber, and a fluid metering device fluidly engages the fluid passage exit, and wherein a fluid from the cooling compartment passes to the fluid metering device via the fluid passage to provide hydration to the pet.

20. A pet kennel, comprising:

an upper portion;

a lower portion;

the upper portion and the lower portion join together to define a pet chamber to house a pet;

an opening to the pet chamber;

a door to open and close the opening; and, the upper portion comprising a cooling media compartment, wherein the cooling media compartment is in fluidic communication with the pet chamber via a fluid passage that passes through a bottom surface of the cooling media compartment to provide fluid from the cooling media compartment to the pet chamber.

* * * * *